United States Patent
Takahashi

(10) Patent No.: US 7,577,197 B2
(45) Date of Patent: Aug. 18, 2009

(54) VIDEO ENCODER TRANSMITTING EXTRACTED IMAGE TO EXTERIOR DURING ENCODING PROCESS

(75) Inventor: Tetsu Takahashi, Kawasaki (JP)

(73) Assignee: Fujitsu Microelectronics Ltd., Tokyo (JP)

( * ) Notice: Subject to any disclaimer, the term of this patent is extended or adjusted under 35 U.S.C. 154(b) by 535 days.

(21) Appl. No.: 11/446,147

(22) Filed: Jun. 5, 2006

(65) Prior Publication Data

US 2006/0222082 A1    Oct. 5, 2006

Related U.S. Application Data

(63) Continuation of application No. PCT/JP2004/000923, filed on Jan. 30, 2004.

(51) Int. Cl.
  *H04B 1/66* (2006.01)
(52) U.S. Cl. .............. 375/240.01; 375/240.28; 375/240.02; 375/240.24; 375/240.26; 382/239; 382/232; 382/235; 348/513; 348/523; 348/516
(58) Field of Classification Search ........... 375/240.01, 375/240.28, 240.02, 240.24, 240.26; 382/239, 382/232, 235; 348/513, 523, 516
See application file for complete search history.

(56) References Cited

U.S. PATENT DOCUMENTS 6,044,206 A    3/2000  Kohn
6,148,035 A  * 11/2000  Oishi et al. ............ 375/240.26
6,380,983 B1 *  4/2002  Miyazaki et al. ............ 348/554
7,460,182 B2 * 12/2008  Takahashi ................... 348/714
2003/0052986 A1  3/2003  Matsumoto

FOREIGN PATENT DOCUMENTS

| EP | 1 107 613 A2 | 6/2001 |
| JP | 5-37923 A | 2/1993 |
| JP | 10-210481 A | 8/1998 |
| JP | 11-98507 A | 4/1999 |
| JP | 2002/77803 A | 3/2002 |
| JP | 2003-186740 A | 7/2003 |

OTHER PUBLICATIONS

Grehan R: "Virtually Virtual Memory" Byte, Mcgraw-Hill Inc. St Peterborough, US, vol. 15, No. 9, Sep. 1, 1990, pp. 455/456,458-460, 462, 4, XP008028170.

* cited by examiner

Primary Examiner—Shawn An
(74) Attorney, Agent, or Firm—Arent Fox LLP

(57) ABSTRACT

A video encoder includes a frame synchronizer to temporarily store video data supplied from an exterior in a plurality of memory banks repeatedly selected in a predetermined sequence and to read the video data successively from the plurality of memory banks repeatedly selected in said predetermined sequence, an encode unit to encode the video data read by the frame synchronizer, and a control unit to perform a bank switch process that swaps one memory bank among the plurality of memory banks for another memory bank separate from the plurality of memory banks.

10 Claims, 8 Drawing Sheets

VIDEO ENCODER TRANSMITTING EXTRACTED IMAGE TO EXTERIOR DURING ENCODING PROCESS

CROSS-REFERENCE TO RELATED APPLICATION

This is a continuation of International Application No. PCT/JP2004/000923, filed on Jan. 30, 2004, the entire contents of which are hereby incorporated by reference.

BACKGROUND OF THE INVENTION

1. Field of the Invention

The present invention generally relates to vide encoders for encoding video data in real time, and particularly relates to a vide encoder provided with the function to extract an image from the video data.

2. Description of the Related Art

In recording equipment such as hard-disk recorders or the like, an analog input NTSC video signal is MPEG-encoded, and the encoded video data is recorded on a hard disk or the like.

To be specific, an analog input NTSC video signal is converted into the ITU-R656 format by use of an NTSC decoder, and the converted video data is supplied to an MPEG2 encoder. The supplied video data is written to a frame memory externally attached to the MPEG2 encoder via a frame synchronizer provided in the MPEG2 encoder. The frame memory has a plurality of banks (e.g., three banks). A bank to which data is written is successively specified, and the bank having the oldest data stored therein is overwritten by use of new data.

Analog input audio signals are converted into the I2S format by use of an audio ADC (analog-to-digital converter), and the converted audio data is supplied to the MPEG2 encoder.

Among the frame data written to the plurality of banks of the frame memory, the frame data of the oldest bank is read from the frame memory by the MPEG2 encoder. The read frame data is transferred via the frame synchronizer provided in the MPEG2 encoder to an MPEG2 video encode unit for encoding into the MPEG2 video MP@ML format. Further, the audio data is encoded into data in the MPEG1 audio-layer-2 format. The system multiplexer provided in the MPEG2 encoder multiplexes the video stream and audio stream obtained in this manner into the MPEG2-PS format for output as a multiplexed stream to an exterior of the MPEG2 encoder via the 8-bit dedicated port.

The stream output from the MPEG2 encoder is recorded on the hard disk via an IDE-I/F.

In such a manner as described above, vide contents such as television programs, movies, and the like are stored in the hard disk as separate files. Recording equipment such as hard-disk recorders or the like may sometimes use small-sized thumbnail images for the purpose of managing these files. When a list of files corresponding to respective video contents are to be presented to the user, for example, thumbnail images corresponding to the files may be displayed, thereby allowing the user to identify the contents of the files easily.

Thumbnail images are generated by obtaining 360-×-240 pixels, for example, by subsampling image data of 720-×-480 pixels, which correspond to the valid image area of the ITU-R656-format video data. The microcomputer embedded in a hard-disk recorder or the like generates such thumbnail images for the purpose of managing file information, and stores these thumbnail images in memory such as a RAM.

In order to generate a thumbnail image, there is a need to extract one image from the video data output from the NTSC decoder, for example, for transfer to the microcomputer. In such a case, a dedicated circuit needs to be provided to extract an image from the video data output from the NTSC decoder, which leads to a cost increase with respect to the system.

It is also conceivable to use the MPEG2 encoder to extract an image from the frame memory. This requires a dedicated function to be newly implemented. When three banks are provided in the frame memory, there is a need to read an image from one of the banks for use in creating a thumbnail image separately from the encoding process while this ongoing encoding process keeps writing and reading data to/from the three banks. One frame of the NTSC video data is 33 ms, so that the bank from which data is read for creation of a thumbnail image will be overwritten unless the data is read within the 66-ms period during which writing is performed with respect to the two other banks. This makes it necessary to give high priority to the process of reading an image for creation of a thumbnail, which ends up necessitating special control procedures, and affects the ongoing encoding operation.

Accordingly, there is a need for an MPEG encoder that can extract image data from video data for transfer to a microcomputer without affecting the encoding operation.

SUMMARY OF THE INVENTION

It is a general object of the present invention to provide an MPEG encoder that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an MPEG encoder particularly pointed out in the specification in such full, clear, concise, and exact terms as to enable a person having ordinary skill in the art to practice the invention.

To achieve these and other advantages in accordance with the purpose of the invention, the invention provides a video encoder, which includes a frame synchronizer to temporarily store video data supplied from an exterior in a plurality of memory banks repeatedly selected in a predetermined sequence and to read the video data successively from the plurality of memory banks repeatedly selected in said predetermined sequence, an encode unit to encode the video data read by the frame synchronizer, and a control unit to perform a bank switch process that swaps one memory bank among the plurality of memory banks for another memory bank separate from the plurality of memory banks.

In the video encoder described above, the bank switch process that swaps one memory bank among the plurality of memory banks for another memory bank separate from the plurality of memory banks is performed, so that the frame data stored in the swapped memory bank can be preserved without being overwritten. When the preserved image data is to be transferred by a subsequent data transmission process, the data transmission process can be performed at any opportune timing such as not to affect the encoding process. The data transmission process may be performed step by step, according to need, for each divided data piece that is the size of a small data unit for transfer. This makes it possible to extract image data from video data for transfer to an exterior without affecting the encoding operation.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described in detail with reference to the accompanying drawings.

Figure 1:
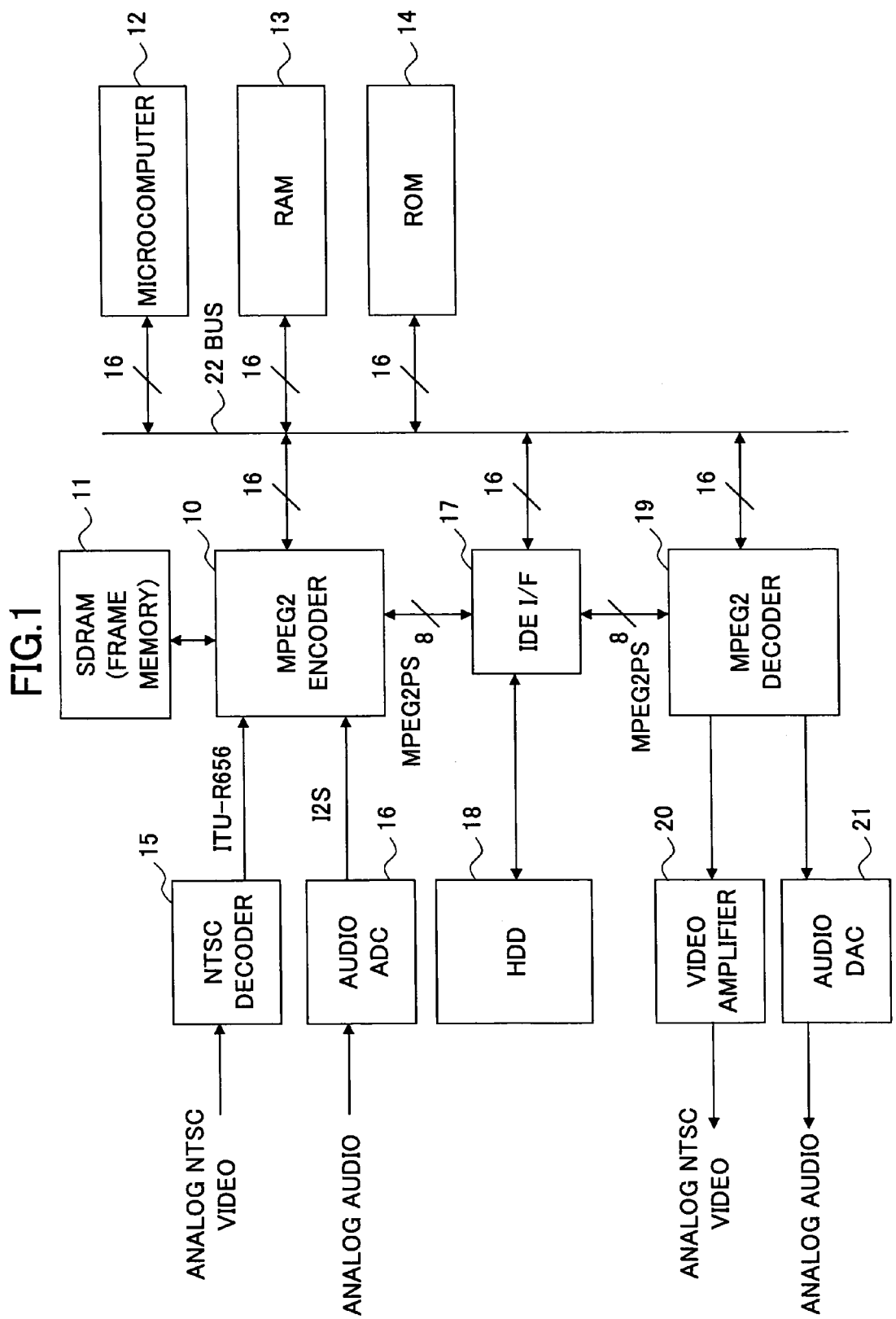
FIG. 1 is a block diagram showing the configuration of a hard-disk recorder to which the present invention is applied.

FIG. 1 is a block diagram showing the configuration of a hard-disk recorder to which the present invention is applied. It should be noted that the present invention is not only applicable to hard-disk recorders but also applicable to DVD recorders. The present invention is applicable to apparatuses in general that encode and record analog video signals or digital video data supplied in real time.

The hard-disk recorder of FIG. 1 includes an MPEG2 encoder 10, a frame memory 11 comprised of SDRAM (Synchronous Dynamic Random Access Memory) or the like, a microcomputer 12, a RAM 13, a ROM 14, an NTSC decoder 15, an audio ADC 16, an IDE-I/F 17, a hard-disk drive (HDD) 18, an MPEG2 decoder 19, a video amplifier 20, and an audio DAC 21. The MPEG2 encoder 10, the microcomputer 12, the RAM 13, the ROM 14, the IDE-I/F 17, and the MPEG2 decoder 19 are connected to each other via a bus 22 that is a parallel bus.

Figure 2:
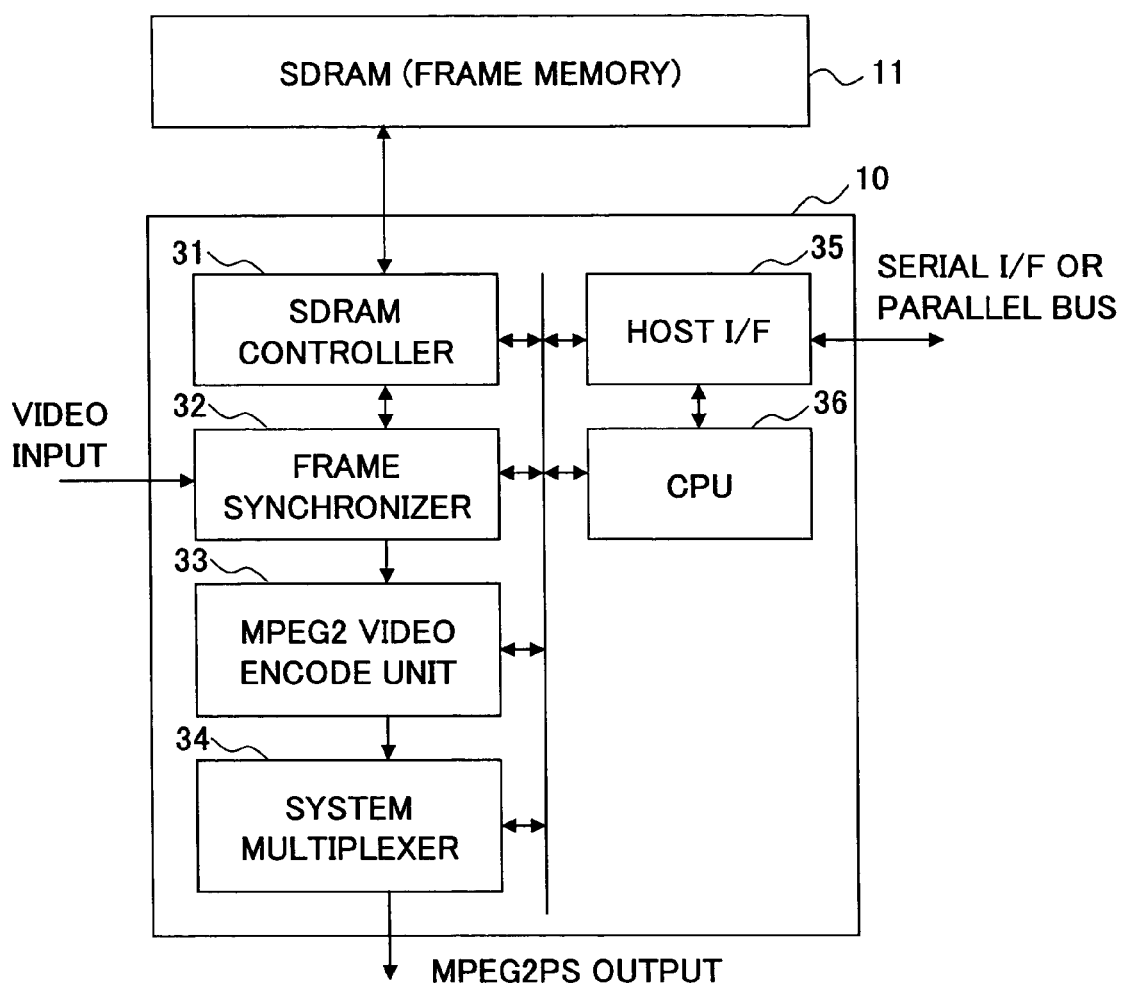
FIG. 2 is a block diagram showing the configuration of the MPEG2 encoder according to the present invention.

FIG. 2 is a block diagram showing the configuration of the MPEG2 encoder 10 according to the present invention. The MPEG2 encoder 10 shown in FIG. 2 includes an SDRAM controller 31, a frame synchronizer 32, an MPEG2 video encode unit 33, a system multiplexer 34, a host I/F 35, and a CPU 36. The host I/F 35 is connected to the microcomputer 12 via the bus 22 (FIG. 1) that is a parallel bus. In another embodiment, which will later be described, the host I/F 35 may be connected to the microcomputer 12 via a serial I/F (serial interface). In FIG. 2, the illustration of the units relating to audio-data processing that have no direct connection with the configuration of the present invention is omitted.

At the time of recording, an analog input NTSC video signal is converted into the ITU-R656 format by use of the NTSC decoder 15, and the converted video data is supplied to the MPEG2 encoder 10. The supplied video data is written to the frame memory 11 externally attached to the MPEG2 encoder via the frame synchronizer 32 and SDRAM controller 31 provided in the MPEG2 encoder 10. The frame memory 11 has a plurality of banks (e.g., three banks). A bank to which data is written is successively specified, and the bank having the oldest data stored therein is overwritten by use of new data.

Analog input audio signals are converted into the I2S format by use of the audio ADC 16, and the converted audio data is supplied to the MPEG2 encoder 10.

Among the frame data written to the plurality of banks of the frame memory 11, the frame data of the oldest bank is read from the frame memory 11 by the MPEG2 encoder 10. The read frame data is transferred via the SDRAM controller 31 and frame synchronizer 32 provided in the MPEG2 encoder 10 to the MPEG2 video encode unit 33 for encoding into the MPEG2 video MP@ML format. Further, the audio data is encoded into data in the MPEG1 audio-layer-2 format. The system multiplexer 34 provided in the MPEG2 encoder 10 multiplexes the video stream and audio stream obtained in this manner into the MPEG2-PS format for output as a multiplexed stream to an exterior of the MPEG2 encoder 10 via the 8-bit dedicated port.

In the processes described above, the microcomputer 12 supplies an encoding start command, a stop command, and the like via the host I/F 35 to control the operation of the MPEG2 encoder 10. A plurality of banks are provided in the frame memory 11, so that the frame synchronizer 32 can absorb a difference in the frame rate even if the frame rate of the video signal input and the frame rate of the encoding process performed by the MPEG2 video encode unit 33 are not synchronized with each other.

The stream output from the MPEG2 encoder 10 is recorded on the hard-disk drive (HDD) 18 via the IDE-I/F 17. In so doing, the IDE-I/F 17 performs a DMA transfer to transfer the stream output from the 8-bit port of the MPEG2 encoder 10 to the hard-disk drive (HDD) 18. Instructions to start the transfer, stop the transfer, specify the addresses, and so on are given via register settings made by the microcomputer 12.

The IDE-I/F 17 is connected to the bus 22, so that the microcomputer 12 can access a desired address on the hard-disk drive (HDD) 18 via the IDE-I/F 17.

At the time of reproduction, the IDE-I/F 17 performs a DMA transfer to transfer the stream stored on the hard-disk drive (HDD) 18 to the MPEG2 decoder 19. Instructions to start the transfer, stop the transfer, specify the addresses, and so on are given via register settings made by the microcomputer 12.

The MPEG2 decoder 19 separates (demultiplexes) the supplied multiplexed stream to generate a video stream (MPEG2MP@ML) and an audio stream (MPEG1-layer-2). The MPEG2 decoder 19 further decodes the video stream and the audio stream, respectively, and outputs the video signal in the NTSC format and the audio data in the I2S format.

The video amplifier 20 amplifies the video signal output from the MPEG2 decoder 19 for output as an analog NTSC video signal for reproduction purposes. The audio DAC 21 converts the audio data output from the MPEG2 decoder 19 for output as an analog audio signal for reproduction purposes.

Figure 3:
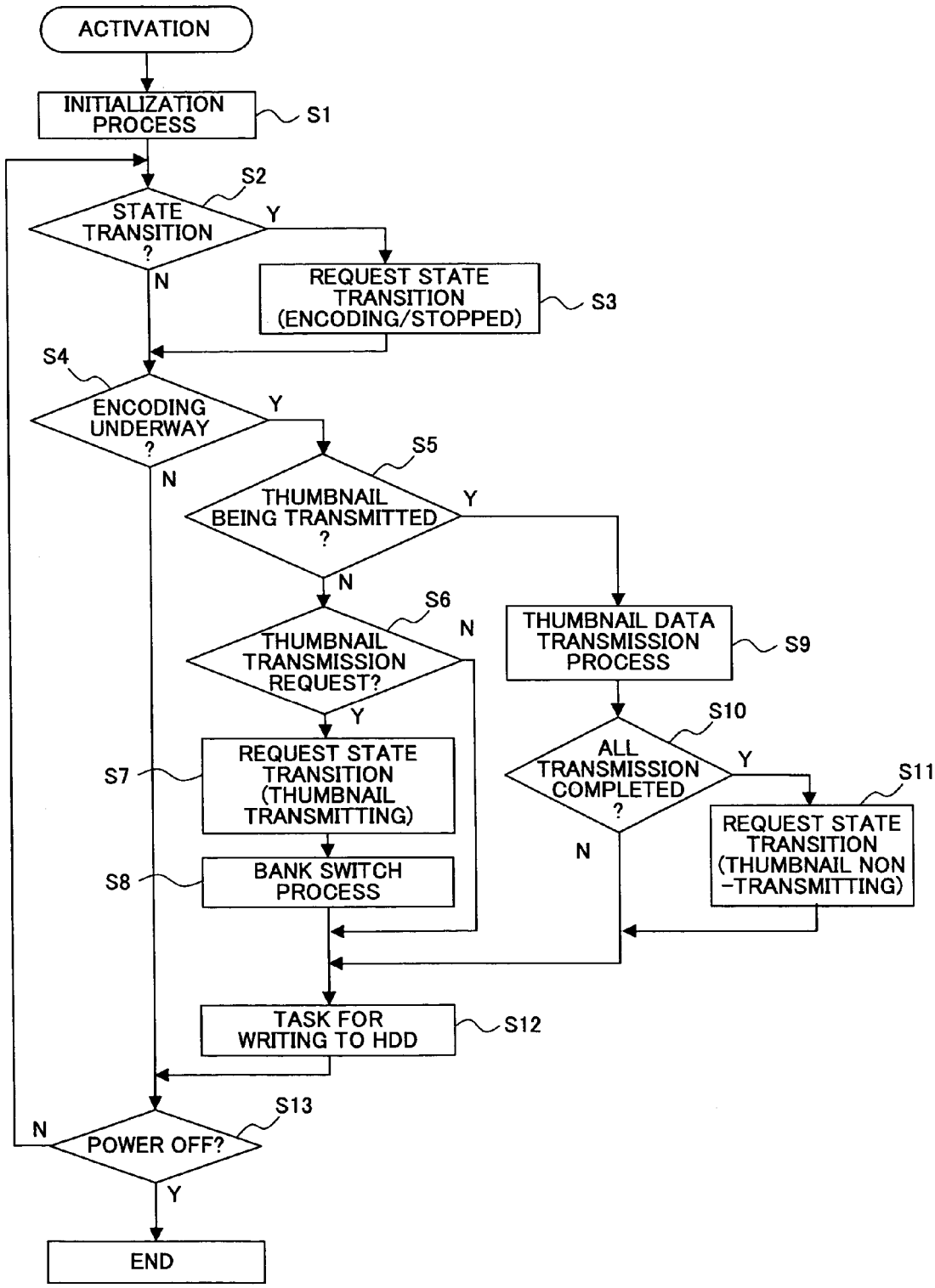
FIG. 3 is a flowchart showing the acquisition and transmission of thumbnail data according to the present invention.

FIG. 3 is a flowchart showing the acquisition and transmission of thumbnail data according to the present invention. The process of FIG. 3 is mainly performed by the CPU 36 of the MPEG2 encoder 10. That is, the CPU 36 serves as a control unit that controls the acquisition and transmission process of thumbnail data.

At step S1 of FIG. 3, an initialization process is performed. That is, the hard-disk recorder shown in FIG. 1 is subjected to various initialization processes that are performed upon power-on, for example. The frame synchronizer 32 include registers for storing pointers pointing to the respective banks of the frame memory 11. The initialization process describe above includes the process of initializing the contents of these registers.

At step S2, a check is made as to whether a state transition is to be performed. If a state transition is to be performed, the procedure goes to step S3. If a state transition is not to be performed, the procedure goes to step S4.

Figure 4:
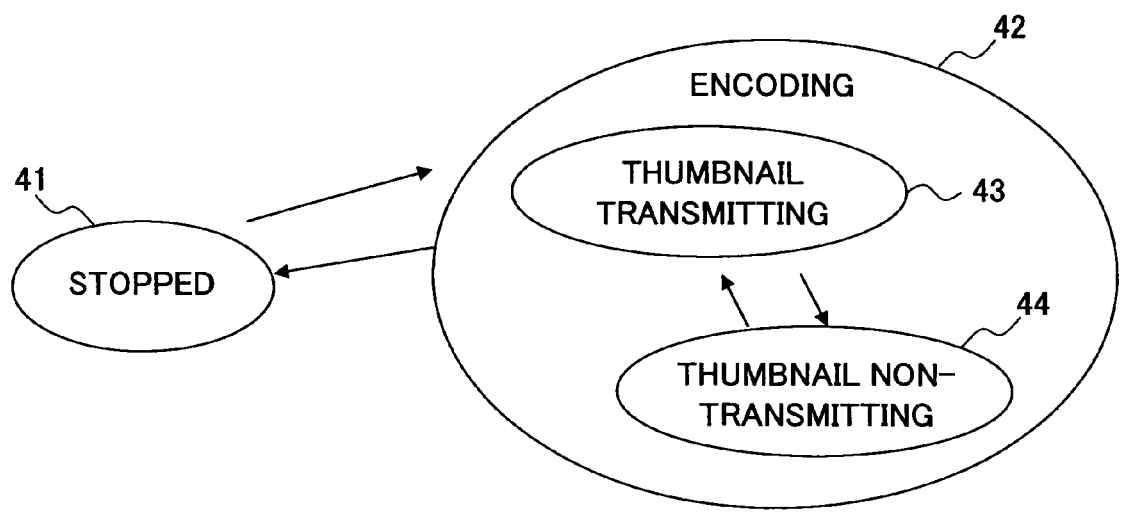
FIG. 4 is a drawing showing the state transition of a hard-disk recorder.

At step S3, a state transition is requested. FIG. 4 is a drawing showing the state transition of a hard-disk recorder. As shown in FIG. 4, the hard-disk recorder has a stopped state 41 and an encoding state 42. The encoding state 42 includes a thumbnail transmitting state 43 and a thumbnail non-transmitting state 44. Immediately after the hard-disk recorder is powered on, the hard-disk recorder is placed in the stopped state 41. Thereafter, a record operation is requested via a switch, a remote controller, or the like, resulting in a state transition occurring to switch from the stopped state 41 to the encoding state 42 at step S3.

At step S4, a check is made as to whether the encoding state 42 is the current state. If the encoding state 42 is the current state, the procedure goes to step S5. If the encoding state 42 is not the current state, the procedure goes to step S13.

At step S5, a check is made as to whether the thumbnail transmitting state 43 is the current state. If the thumbnail transmitting state 43 is the current state, the procedure goes to step S9. If the thumbnail transmitting state 43 is not the current state, the procedure goes to step S6.

At step S6, a check is made as to whether thumbnail transmission is requested. The thumbnail transmission request may be generated in response to a trigger, which may be the detection in the MPEG2 encoder 10 of such timing as the scenes of the input video signal are changed significantly (i.e., scene change). Alternatively, an instruction given from the microcomputer 12 to the host I/F 35 may be used as such a trigger. Alternatively, the MPEG2 encoder 10 may spontaneously generate a thumbnail transmission request at constant intervals. If thumbnail transmission is requested, the procedure goes to step S7. If thumbnail transmission is not requested, the procedure goes to step S12.

At step S7, a state transition is ordered so as to shift to the thumbnail transmitting state 43.

Figure 5:
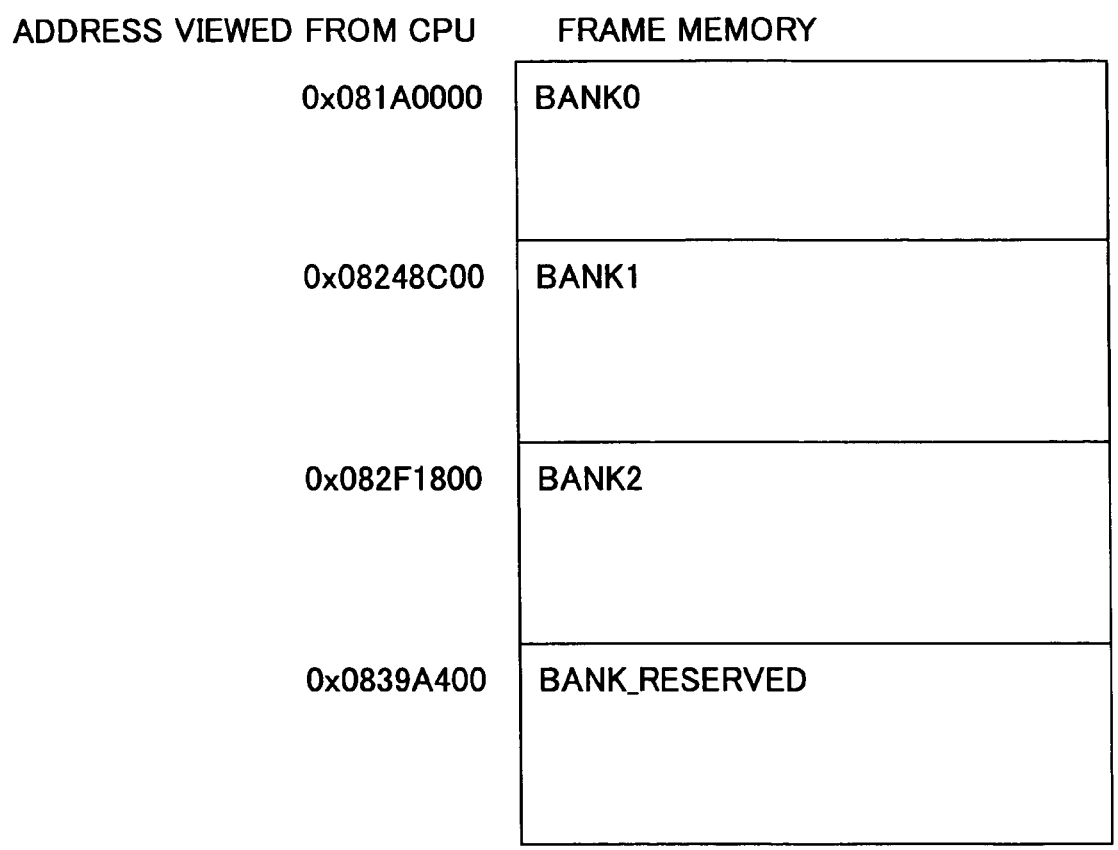
FIG. 5 is a drawing for explaining the bank switch process.
Figure 6:
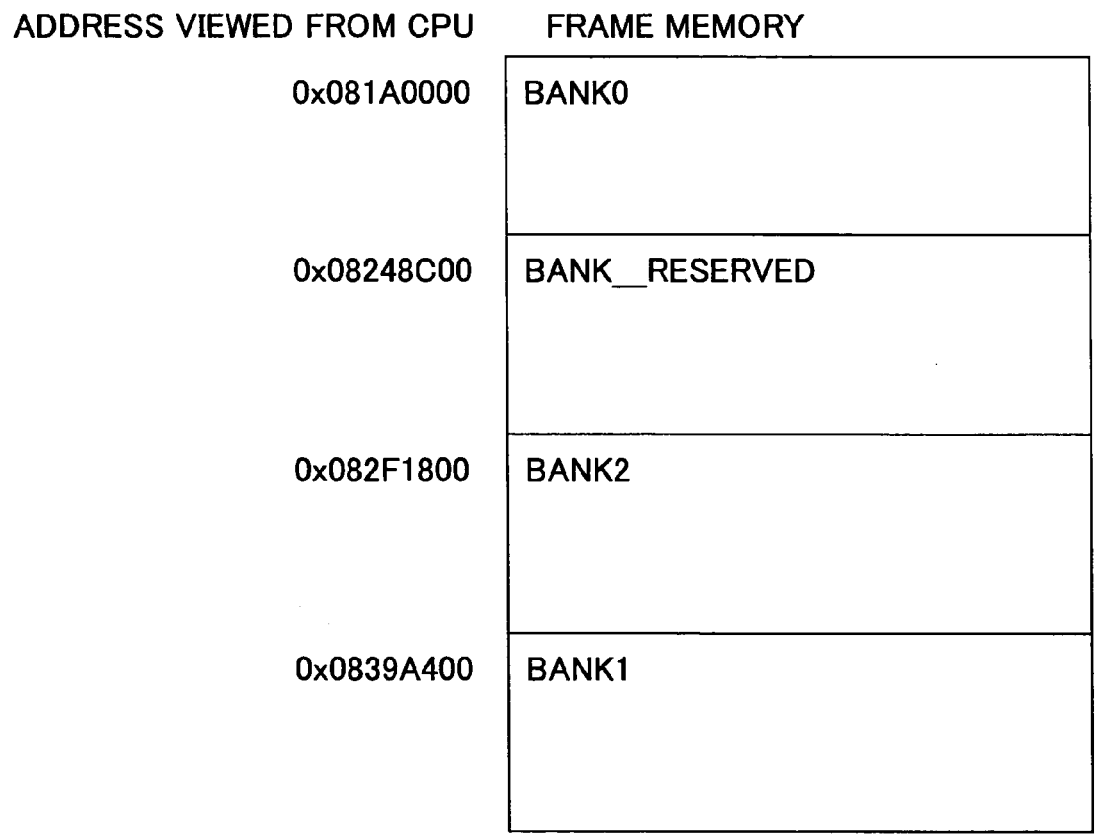
FIG. 6 is a drawing for explaining the bank switch process.

At step S8, a bank switch process is performed. FIG. 5 and FIG. 6 are drawings for explaining the bank switch process. As was previously described, the frame synchronizer 32 includes the registers for storing pointers pointing to the respective banks of the frame memory 11. These registers are a BANK0 start address register, a BANK1 start address register, a BANK2 start address register, and the most-recently-written-bank register. The most-recently-written-bank register serves to point to the bank to which the newest frame data is written among the frame data that have been written to the frame memory 11 and yet to be encoded.

As shown in FIG. 5, the start addresses of the banks are set to the values as listed below immediately after the initialization process.

BANK0=0X081A0000
BANK1=0X08248C00
BANK2=0X082F1800

Further, the CPU 36 sets, to a variable BANK_RESERVED, 0x0839A400 that is the start address of the reserved bank. In the bank switch process at step S8 of FIG. 3, the CPU 36 reads the content of the most-recently-written-bank register to identify the most recent bank, and swaps the value of BANK_RESERVED for the value of the start address register of the most-recently-written bank. If a thumbnail transmission request is given when BANK0 through BANK2 are initially in the states as shown in FIG. 5, for example, the most-recently-written-bank register may be pointing to BANK1. In such a case, BANK1 is set equal to 0x0839A400, and BANK_RESERVED is set equal to 0x08248C00. As a result, the bank start addresses stored in the registers are set as shown in FIG. 6.

As a result of the above process, if a bank switch process occurs during a write operation with respect to BANK2 while writing and reading for the encoding process are performed with respect to the banks in the following order: BANK0 (0X081A0000) →BANK1(0X08248C00) →BANK2 (0X082F1800) →BANK0(00X081A0000) →BANK1 (0X08248C00) →BANK2(0X082F1800) → . . . , then, the writing and reading for the encoding process are performed in the following order: BANK0(0X081A0000) →BANK1 (0X08248C00) →BANK2(0X082F1800)(the occurrence of the bank switch process) →BANK0(0X081A0000) →BANK1(0X0839A400) →BANK2(0X082F1800) →BANK0(0X081A0000) →BANK1(0X0839A400) →BANK2(0X082F1800) → . . . . As a result, the contents of current BANK_RESERVED (0x08248C00), which was originally BANK1, are maintained as they are, so that a subsequent thumbnail image transmission process can retrieve the contents of BANK_RESERVED (0x08248C00) for transmission at any time that is convenient.

At step S12 of FIG. 3, a write process with respect to the hard-disk drive (HDD) 18 is performed. As a result, encoded video data and audio data are recorded as a multiplexed stream on the hard-disk drive (HDD) 18.

At step S13, a check is made as to whether the power of the hard-disk recorder is OFF. If the power is OFF, the procedure comes to an end. If the power is not OFF, the procedure goes back to step S2.

If it is thereafter ascertained at step S5 that the thumbnail transmitting state 43 is the current state, the procedure goes to step S9. At step S9, a thumbnail data transmission process is performed. In the thumbnail data transmission process, the frame data having its start address at the address specified by BANK_RESERVED are transmitted to the microcomputer 12 by the increments of 4 bytes, for example. When the transmission of 4-byte data that is the unit of transmission is completed, the process of step S10 comes to an end. When the next thumbnail data transmission process is to be performed thereafter, data of the next 4 bytes will be transmitted.

At step S10, a check is made as to whether the transmission of all the data is completed. If the transmission of all the data is completed, a state transition is requested at step S11 to shift to the thumbnail non-transmitting state 44.

In the manner as described above, the frame data of a given bank is preserved via the bank switch process, and the preserved image data is successively transferred to the microcomputer 12 by increments of a small data transfer amount which has almost no effect on the encoding process. This makes it possible to extract image data from video data for transfer to the microcomputer 12 without affecting the encoding operation.

The microcomputer 12 subsamples the received data to generate a thumbnail image for storage in memory such as the RAM 13. Rather than transmitting all the data of the selected image from the MPEG2 encoder 10 to the microcomputer 12, the image data may be subsampled first to generate a thumbnail image, which is then transmitted to the microcomputer 12. Further, such image may be subjected to some kind of transformation such as filtering prior to the transmission to the microcomputer 12.

In the following, the relationship between the encoding process and the thumbnail data transmission process will be described.

Figure 7A:
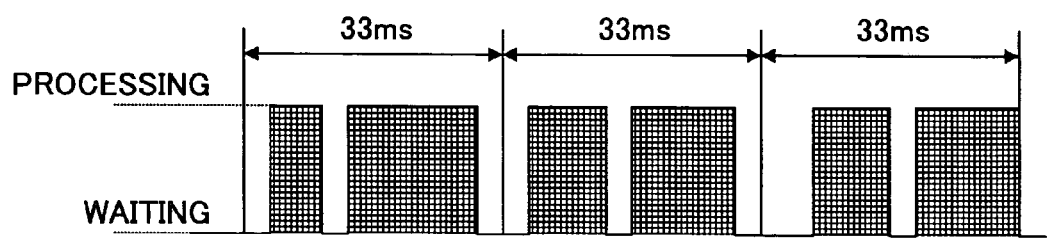
FIGS. 7A and 7B are drawings showing the way the encoding process is performed and the way the thumbnail data transmission process is performed, respectively.
Figure 7B:
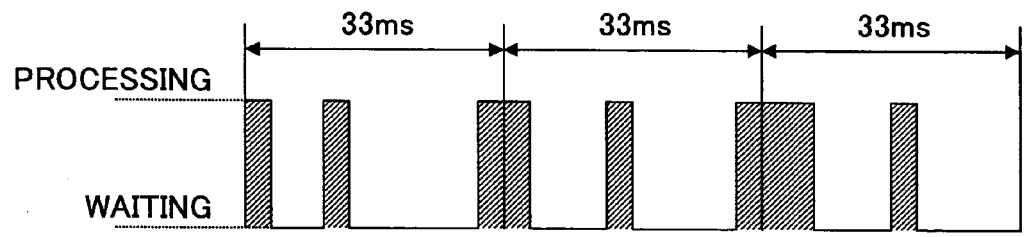

FIGS. 7A and 7B are drawings showing the way the encoding process is performed and the way the thumbnail data transmission process is performed, respectively. The encoding process by the CPU 36 and the MPEG2 video encode unit 33 consumes 90% of the CPU processing time on average, for example, as illustrated in FIG. 7A. In FIG. 7A, the horizontal axis represent time, and the hatched portions indicated as "PROCESSING" account for 90% of the total time. The encoding process needs to be performed to keep pace with the video data and audio data supplied in real time, and, thus, must be performed ahead of other processes.

When three banks are provided in the frame memory, there is a need to read an image from one of the banks for use in creating a thumbnail image separately from the encoding process while this ongoing encoding process keeps writing and reading data to/from the three banks. One frame of the NTSC video data is 33 ms, so that the bank from which data is read for creation of a thumbnail image will be overwritten unless the data is read within the 66-ms period during which writing is performed with respect to the two other banks.

Accordingly, the transmission of thumbnail data must be completed within 66 ms (or shorter) by use of 10% of the CPU power that remains after the hatched portions are used for the encoding as shown in FIG. 7A. If the thumbnail transmission process requires 15%×66 ms of the CPU load, the conditions as shown in FIG. 7A do not allow such transmission.

In the present invention, the frame data of a bank is preserved via the bank switch process, and the preserved image data is successively transferred to the microcomputer by increments of a small data transfer amount which has almost no effect on the encoding process. After the bank switch process is performed, the above-noted time limit of 66 ms is no longer in existence. The occupancy rate of the thumbnail data transmission process in the CPU load can thus be lowered. Even if the thumbnail data transmission process requires 15%×66 ms of the CPU load in total, this process can be divided into 10 transmission processes, which require 1.5%×660 ms of the CPU load.

Figure 8:
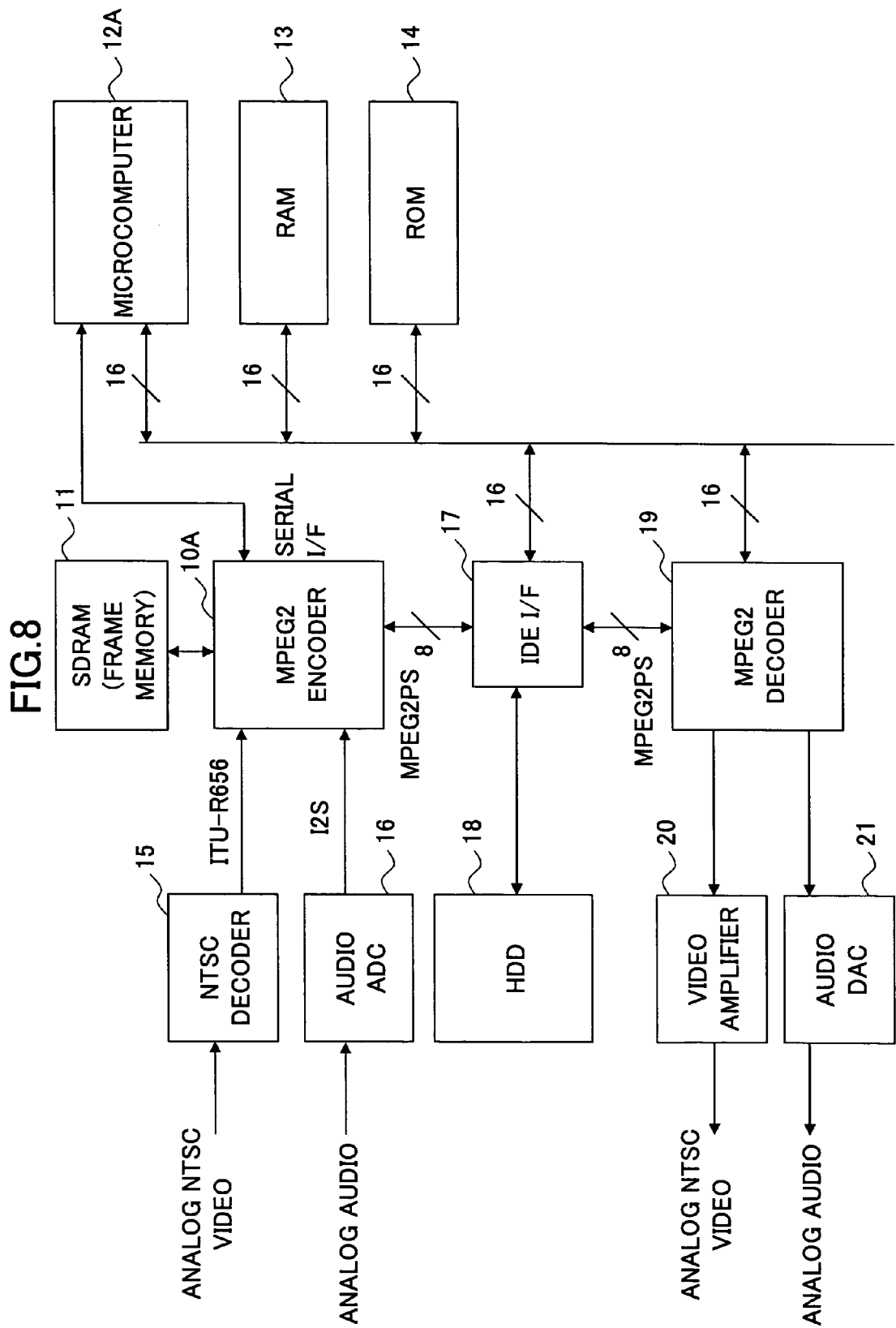
FIG. 8 is a block diagram showing another example of the configuration of a hard-disk recorder to which the present invention is applied.

FIG. 8 is a block diagram showing another example of the configuration of a hard-disk recorder to which the present invention is applied.

The hard-disk recorder shown in FIG. 8 differs from the hard-disk recorder shown in FIG. 1 in that the transmission of thumbnail data is performed via a serial interface between an MPEG2 encoder 10A and a microcomputer 12A. When the thumbnail data transmission is performed via a serial interface as in this case, the time required for the transmission of data is longer than in the case of using a parallel bus. As a result, the CPU processing time that is spent on the thumbnail data transmission becomes longer, which means that the merits of using the bank switch process of the present invention are further highlighted.

Although the present invention has been described with reference to embodiments, the present invention is not limited to these embodiments, but various variations and modifications may be made without departing from the scope of the invention as set forth in the accompanying claims.

In the embodiments described above, the three bank configuration is employed such that write and read operations for the encoding process are performed with respect to the three banks successively, with an additional bank for use for the transmission of a thumbnail image. As an alternative embodiment, a three bank configuration may be employed such that write and read operations for the encoding process are performed with respect to three banks successively at the time of a normal encoding process, while one of these three banks is assigned as a bank dedicated for the transmission of a thumbnail image at the time of transmission of a thumbnail image, with the two remaining banks being used for the successive write and read operations for the encoding process. Similarly to the embodiments described above, this arrangement makes it possible to extract image data from video data for transfer to the microcomputer without affecting the encoding operation.

The present application is based on Japanese priority application No. filed on , , with the Japanese Patent Office, the entire contents of which are hereby incorporated by reference.

What is claimed is:

1. A video encoder, comprising:
    a frame synchronizer to temporarily store video data supplied from an exterior in a plurality of memory banks repeatedly selected in a predetermined sequence and to read the video data successively from the plurality of memory banks repeatedly selected in said predetermined sequence;
    an encode unit to encode the video data read by the frame synchronizer; and
    a control unit to perform a bank switch process that swaps one memory bank among the plurality of memory banks for another memory bank separate from the plurality of memory banks.

2. The video encoder as claimed in claim 1, wherein the control unit performs the bank switch process in response to a thumbnail transmission request.

3. The video encoder as claimed in claim 1, further comprising an interface that transfers the video data read from the one memory bank swapped for said another memory bank to an exterior.

4. The video encoder as claimed in claim 3, wherein the interface is a parallel interface.

5. The video encoder as claimed in claim 3, wherein the interface is a serial interface.

6. The video encoder as claimed in claim 3, wherein a process that transfers the video data read from the one memory bank swapped for said another memory bank to an exterior is performed step by step such that the video data is divided into data pieces the size of a predetermined data unit for transfer.

7. The video encoder as claimed in claim 3, wherein a process that transfers the video data read from the one memory bank swapped for said another memory bank to an exterior is performed as a process that transfers thumbnail data made by sabsampling the video data.

8. The video encoder as claimed in claim 1, wherein the frame synchronizer includes registers for storing a plurality of pointers pointing to the respective memory banks, and the control unit performs the bank switch process by replacing one of the pointers corresponding to the one memory bank with a pointer corresponding to said another memory bank.

9. The video encoder as claimed in claim 8, wherein the frame synchronizer repeatedly selects, in a predetermined sequence after the bank switch process, a plurality of memory banks corresponding to the plurality of pointers among which said one of the pointers is replaced.

10. The video encoder as claimed in claim 1, wherein the video data supplied from the exterior is digital data supplied in real time at a pace corresponding to analog video signal.

* * * * *